US012509198B2

(12) United States Patent
Nielsen (10) Patent No.: US 12,509,198 B2
(45) Date of Patent: Dec. 30, 2025

(54) SURVIVAL CRAFT (71) Applicant: VIKING LIFE-SAVING EQUIPMENT A/S, Esbjerg (DK)

(72) Inventor: Jens Nielsen, Esbjerg (DK)

(73) Assignee: VIKING LIFE-SAVING EQUIPMENT A/S, Esbjerg V (DK)

( * ) Notice: Subject to any disclaimer, the term of this patent is extended or adjusted under 35 U.S.C. 154(b) by 416 days.

(21) Appl. No.: 18/044,372

(22) PCT Filed: Sep. 16, 2021

(86) PCT No.: PCT/EP2021/075547
§ 371 (c)(1),
(2) Date: Mar. 7, 2023

(87) PCT Pub. No.: WO2022/058464
PCT Pub. Date: Mar. 24, 2022

(65) Prior Publication Data
US 2023/0322344 A1 Oct. 12, 2023

(30) Foreign Application Priority Data

Sep. 17, 2020 (EP) ................................. 20196564

(51) Int. Cl.
*B63C 9/04* (2006.01)
*B63B 7/08* (2020.01)
(Continued)

(52) U.S. Cl.
CPC ............... *B63C 9/04* (2013.01); *B63B 7/082* (2013.01); *B63C 9/03* (2013.01); *B63H 5/08* (2013.01);
(Continued)

(58) Field of Classification Search
CPC ....... B63C 9/04; B63C 9/03; B63C 2009/035; B63C 2009/042; B63B 7/082; B63H 5/08;
(Continued)

(56) References Cited

U.S. PATENT DOCUMENTS

| 4,418,633 | A  | * | 12/1983 | Krautkremer | ........ B63H 21/213 74/109 |
| 6,848,382 | B1 | * | 2/2005 | Bekker | .................. B63H 25/42 701/116 |
| 2004/0004135 | A1 | * | 1/2004 | Hamamatsu | ......... G05D 1/0206 440/38 |

FOREIGN PATENT DOCUMENTS

| CN | 110606180 A | 12/2019 |
| EP | 2139756 A1 | 1/2010 |

(Continued)

OTHER PUBLICATIONS

International Search Report corresponding to PCT/EP2021/075547 mailed Oct. 19, 2021.
(Continued)

*Primary Examiner* — Stephen P Avila
(74) *Attorney, Agent, or Firm* — Sandberg Phoenix & von Gontard, PC (57) ABSTRACT

A survival craft for maritime evacuation of passengers and crew members from a vessel or an offshore facility is disclosed. The survival craft has a hull, predominantly made of non-rigid inflatable tubes and one or more shells, the hull has a length, a width and a centerline, a bow and a stern. The survival craft further comprises a first pair of engine-powered propulsion means arranged at the stern on opposite sides of the centerline, and a second pair of engine-powered propulsion means arranged at the bow on opposite sides of the centerline, each engine-powered propulsion means has a propeller or a water jet, wherein a horizontal angle of each (Continued)

propeller or water jet of each engine-powered propulsion means can be independently set in relation to the centerline.

16 Claims, 5 Drawing Sheets

(51) Int. Cl.

| | | |
|---|---|---|
| *B63C 9/03* | (2006.01) | |
| *B63H 5/08* | (2006.01) | |
| *B63H 5/125* | (2006.01) | |
| *B63H 11/00* | (2006.01) | |
| *B63H 11/107* | (2006.01) | |
| *B63H 21/17* | (2006.01) | |
| *B63H 21/21* | (2006.01) | |

(52) U.S. Cl.
CPC ........... *B63H 5/125* (2013.01); *B63H 11/107* (2013.01); *B63H 21/17* (2013.01); *B63H 21/21* (2013.01); *B63C 2009/035* (2013.01); *B63C 2009/042* (2013.01); *B63H 2011/008* (2013.01); *B63H 2021/216* (2013.01)

(58) Field of Classification Search
CPC ................. B63H 5/125; B63H 11/107; B63H 2011/008; B63H 2011/216; B63H 21/17; B63H 21/21
See application file for complete search history.

(56) References Cited

FOREIGN PATENT DOCUMENTS

| | | | |
|---|---|---|---|
| EP | 2720937 A1 | 4/2014 | |
| EP | 2720938 A1 | 4/2014 | |
| EP | 2720939 A1 | 4/2014 | |
| SE | 439913 B | * 7/1985 | ......... B63B 35/4413 |

OTHER PUBLICATIONS

Written Opinion corresponding to PCT/EP2021/075547 mailed Oct. 19, 2021.

Extended European Search Report for corresponding EP Application 20196564.7 mailed Mar. 23, 2021.

\* cited by examiner

SURVIVAL CRAFT

CROSS-REFERENCE TO RELATED APPLICATIONS

This application is the US National Stage under 35 USC § 371 of International Application No. PCT/EP2021/075547, filed 16 Sep. 2021 which claims priority to European Application No. 20196564.7 filed 17 Sep. 2020_, both of which are incorporated herein by reference.

BACKGROUND

The present disclosure relates to a survival craft for maritime evacuation of passengers and crew members from a vessel or an offshore facility, the survival craft has a hull, predominantly made of non-rigid inflatable tubes and one or more shells, the hull has a length, a width and a centerline, a bow and a stern.

Inflatable survival craft having a high capacity in relation to persons have been introduced as maritime rescue and evacuation systems. The advantages of the inflatable survival crafts compared to normal rigid rescue boats are many. The inflatable survival crafts do inter alia not occupy as much room on the vessel compared to the rigid rescue boats, when the inflatable survival crafts are stored in a deflated state on the vessel or offshore structure.

However, the lack of rigidness of the inflatable survival craft is challenging due to the high drag forces from the water on the survival craft when moving the survival craft through the water by means of a propulsion means. When the survival craft has been fully loaded with passengers during a rescue situation, it is essential to the safety of the people on the survival craft that the survival craft can be sailed away, e.g. from a shipwreck, to avoid burning oil, falling debris, suction forces from a sinking ship, or tilting of the ship, or to rescue persons from the water, etc. A further challenge is to maneuver a survival craft away on the lee side of the vessel to be evacuated.

SUMMARY

It is an object to wholly or partly overcome the above disadvantages and drawbacks of the prior art. More specifically, it is an object to provide an improved inflatable survival craft having engine powered propulsion means with enhanced maneuverability.

The above objects, together with numerous other objects, advantages and features, which will become evident from the below description, provided by a survival craft for maritime evacuation of passengers and crew members from a vessel or an offshore facility, the survival craft having a hull, predominantly made of non-rigid inflatable tubes and one or more shells, the hull having a length, a width and a centerline, a bow and a stern, the survival craft further comprising:

- a first pair of engine-powered propulsion means arranged at the stern on opposite sides of the centerline, and
- a second pair of engine-powered propulsion means arranged at the bow on opposite sides of the centerline, each engine-powered propulsion means having a propeller or a water jet, wherein a horizontal angle of each propeller or water jet of each engine-powered propulsion means can be independently set in relation to the centerline.

In addition, the horizontal angle may be adjusted or set at a predetermined horizontal angle.

Furthermore, the horizontal angle may be adjusted during movement of the survival craft.

Moreover, the horizontal angle may be maintained during movement of the survival craft.

The centerline may be set to zero degrees, wherein each horizontal angle of each propeller or water jet is different from zero degrees.

Also, each propeller or water jet of each engine-powered propulsion means of the first pair may be arranged with a horizontal angle between 15 to 45 degrees in relation to the centerline, preferably between 30 to 40 degrees.

Furthermore, each propeller or water jet of each engine-powered propulsion means of the first pair may be angled towards the centerline.

Additionally, each propeller or water jet of each engine-powered propulsion means of the second pair may be arranged with a horizontal angle between 25 to 55 degrees in relation to the centerline, preferably between 40 to 50 degrees, Each propeller or water jet of each engine-powered propulsion means of the second pair may be angled away from the centerline.

Moreover, each engine-powered propulsion means may be operatively connected with a control unit.

Also, each engine-powered propulsion means may be independently controlled.

The survival craft may have a capacity of more than 100 persons, such as more than 150 persons, or even more than 200 persons.

Furthermore, the survival craft may be substantially square-formed when seen from a top view.

In addition, each corner of the survival craft may have an engine-powered propulsion means.

In an embodiment, each engine-powered propulsion means may be arranged in connection with a shell being connected with the non-rigid inflatable tubes.

Moreover, each engine-powered propulsion means may be powered by electricity.

The one or more power supply(ies) may be arranged in the survival craft. The power supplies may be arranged in the shells.

Also, the power supply may be a battery pack.

Additionally, the survival craft in an inflated state has a drag coefficient Cd which drag coefficient Cd changes in view of load and speed of the survival craft.

Furthermore, the survival craft may have an aspect ratio between a length and width above 3:2. In other designs of the survival craft it may have an aspect ratio of above 7:4, or for instance above 2:1.

Moreover, the survival craft may have a dimension above 10 meters in length and 6 meters in width, more preferably above 12 meters in length and 7 meters in width, and even more preferably around 12.5 meters in length and 8 meters in width.

DESCRIPTION OF THE FIGURES

The survival craft and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the survival craft, other parts being omitted or merely suggested.

DETAILED DESCRIPTION

Figure 1:
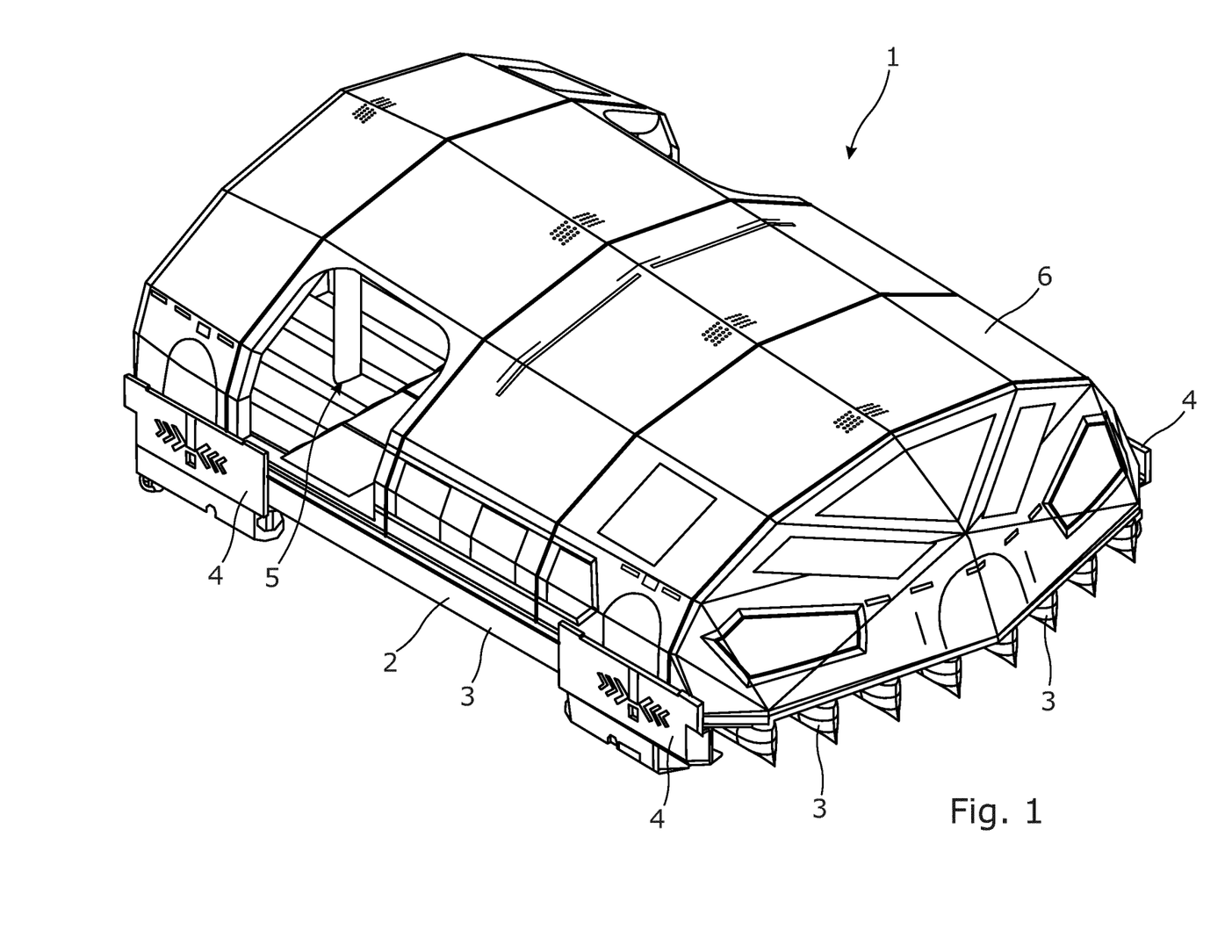
FIG. 1 shows a survival craft in an inflated state.

FIG. 1 shows a survival craft 1 for maritime evacuation of passengers and crew members from a vessel or an offshore facility (not shown). The survival craft 1 has a hull 2, predominantly made of non-rigid inflatable tubes 3 and one or more shells 4. In the present embodiment, the survival craft 1 comprises four shells 4 arranged at each corner of the survival craft 1. In other embodiments, the survival craft 1 may comprise a different number of shells, for instance one, two or a plurality of shells.

When referring to non-rigid inflatable tubes, "non-rigid" refers to materials which may be compressed and packed up in a very small volume when the survival craft is in the deflated state, and which may furthermore be expanded (i.e. inflated) and unpacked very quickly by inflation. Examples of non-rigid materials are polyethylene, natural or synthetic rubbers, polyesters, neoprene, hypalon, polymers and/or combinations thereof. These materials are well known in the art of survival craft and liferafts.

The survival craft is made for maritime rescue and evacuation purposes, and it therefore has a deflated storage configuration and an inflated deployed configuration. The survival craft comprises non-rigid inflatable tubes forming a 3-dimensional space frame when the survival craft is in the inflated deployed configuration as seen in FIG. 1.

The survival craft 1 may comprise an evacuation area 5 to house the passengers and crew members during rescue and evacuation as shown in FIG. 1. The evacuation area 5 is in the present embodiment covered by a canopy 6 for protecting the passengers against the environment.

Figure 2:
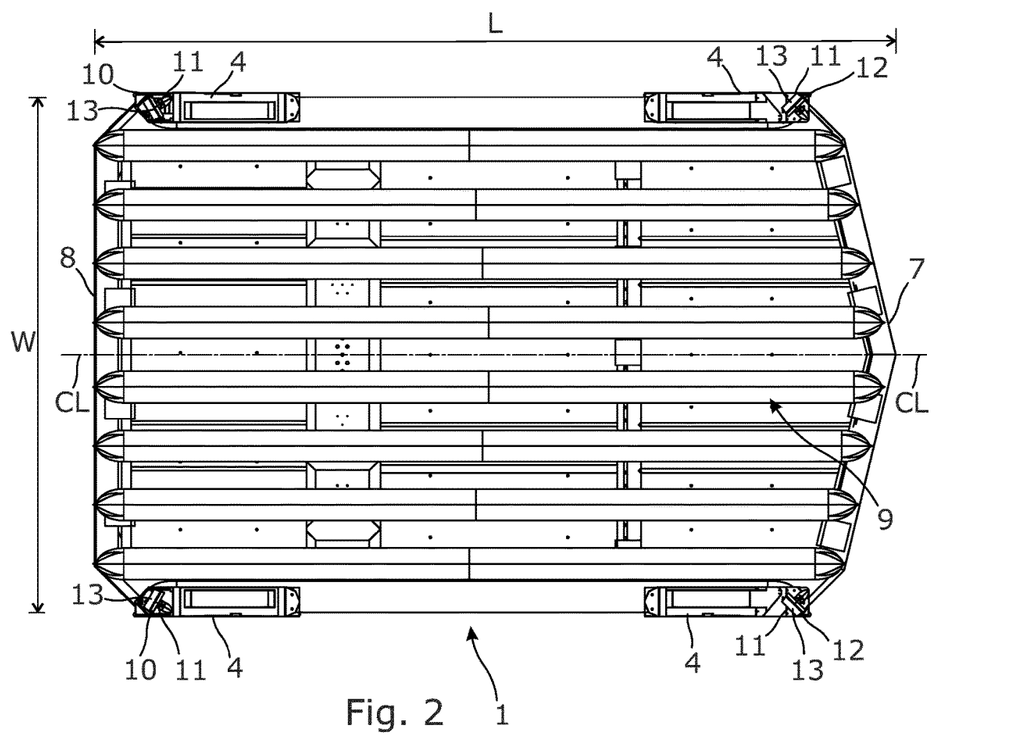
FIG. 2 shows the survival craft of FIG. 1 in a bottom view.

In FIG. 2 the survival craft 1 is shown in a bottom view. The hull 2 has a length L, a width W, a centerline $C_L$, a bow 7 and a stern 8. The hull has a wetted surface area 9. The wetted area 9 is larger than 30 m², or even larger than 45 m². In another embodiment it is larger than 60 m². The wetted surface area 9 is rather large, and hence the drag coefficient is also considerable and thereby the maneuverability of the survival craft is reduced.

To enable the survival craft 1 to be self-propelling, the survival craft further comprises a first pair 10 of engine-powered propulsion means 11 arranged at the stern 8 on opposite sides of the centerline $C_L$, and a second pair 12 of engine-powered propulsion means 11 arranged at the bow 7 on opposite sides of the centerline $C_L$.

In the present embodiment, each shell 4 comprises an engine-powered propulsion means 11.

Each engine-powered propulsion means 11 has a propeller 13 or a water jet. In the present embodiment, the engine-powered propulsion means 11 have propellers 13.

According to the inventive idea, a horizontal angle of each propeller 13 or water jet of each engine-powered propulsion means 11 can be independently set in relation to the centerline $C_L$. Hereby, the maneuverability of survival craft 1 is enhanced. Furthermore, the capability of turning the survival craft 1 is considerably enhanced compared to the existing solutions.

By horizontal angle is meant an angle between any two points within the same horizontal plane.

The centerline $C_L$ extends in a longitudinal direction of the survival craft 1, and the horizontal angle is in relation to any arbitrary line parallel to the centerline $C_L$. As described above, the engine-powered propulsion means are not necessary arranged coincidently with the centerline.

By changing the horizontal angle of the propeller 13 in relation to the centerline $C_L$, the propeller 13 assists in maneuvering the survival craft 1.

Figure 3:
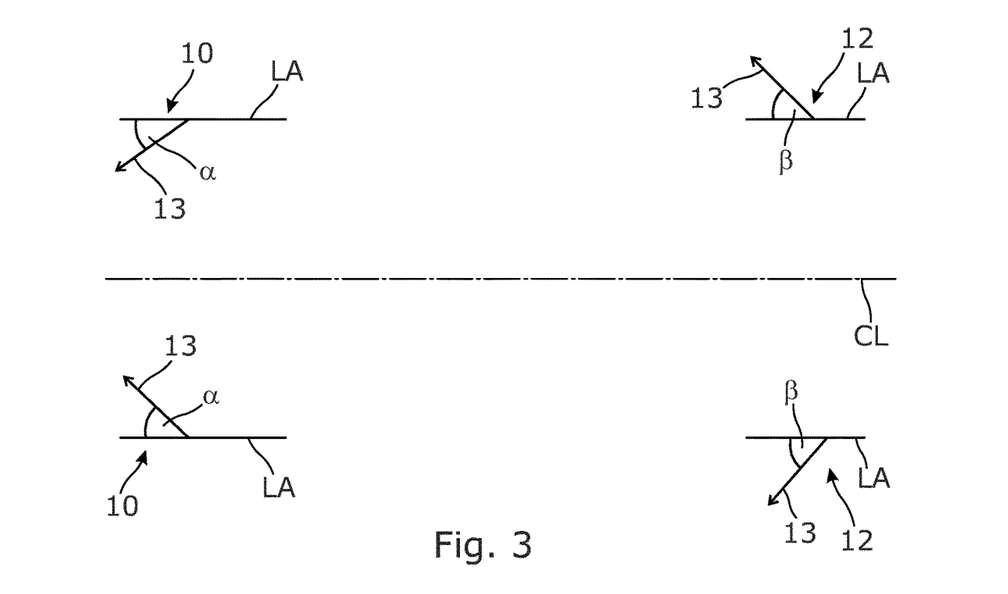
FIG. 3 shows schematically horizontal angles of propellers or water jets.

In FIG. 3, the horizontal angles of the propellers are shown schematically. For instance, the centerline $C_L$ is set to zero degrees, wherein each horizontal angle of each propeller or water jet is different from zero degrees.

The arrows shown in FIG. 3 represent the direction of the propellers 13, i.e. the direction of the propeller force when in operation.

In the shown embodiment, the horizontal angles are set at predetermined horizontal angles so that the horizontal angles are maintained during movement of the survival craft. When setting the horizontal angles to predetermined horizontal angles these angles cannot be adjusted during movement of the survival craft being that they are set by the supplier of the survival craft.

Each propeller 12 or water jet of each engine powered propulsion means of the first pair is arranged with a first horizontal angle α in relation to the centerline $C_L$. For illustrating the first horizontal angle α, arbitrary lines $L_A$ have been shown. The arbitrary lines $L_A$ are parallel to the centerline $C_L$.

As shown in FIG. 3, each propeller 13 or water jet of each engine-powered propulsion means of the first pair 10 is angled towards the centerline $C_L$.

In the present embodiment, the first horizontal angles α are between 15 to 45 degrees in relation to the centerline $C_L$, preferably between 30 to 40 degrees.

Furthermore, each propeller or water jet of each engine-powered propulsion means of the second pair 12 is arranged with a second horizontal angle β in relation to the centerline $C_L$. The arbitrary lines $L_A$ being parallel to the centerline $C_L$ are also shown.

Also, each propeller 13 or water jet of each engine-powered propulsion means of the second pair 12 is angled away from the centerline $C_L$.

In the present embodiment, the second horizontal angles β are between 25 to 55 degrees in relation to the centerline $C_L$, preferably between 40 to 50 degrees.

By having predetermined first horizontal angles α and second horizontal angles 13, the maneuverability of the survival craft 1 is considerably enhanced. In fact, by setting the first horizontal angles α and second horizontal angles β at predetermined angles, it is possible for the operator of the survival craft 1 to turn the survival craft 1 around a point in an arbitrarily plane being parallel to the water. By setting the horizontal angles as mentioned above the maneuverability of the survival craft is considerably enhanced, however, the maximum speed of the survival craft is lower than if the horizontal angles were set to be parallel to the centerline. So, by setting the horizontal angles enhancement of the maneuverability of the survival craft is obtained, whereas the maximum speed of the survival craft is decreased. Hence, the above mentioned predetermined horizontal angles are set as an optimum between maneuverability and maximum speed of the survival craft.

Hence, the operator is able to steer and sail away from the vessel or offshore facility. In addition, in case of a "man overboard" situation the enhanced maneuverability of the survival craft also facilitate evacuation of this/these person(s) since the survival craft is able to turn around the point mentioned above.

In another embodiment, the horizontal angles may be adjusted during movement of the survival craft. This may be obtained by implementing azimuth thrusters which can be rotated to any horizontal angle (azimuth).

In both the above-mentioned embodiments, the survival craft has no rudder and is only maneuvered by help of the propellers or water jets.

Furthermore, the survival craft may comprise a third pair of engine-powered propulsion means arranged between the first pair and second pair on opposite sides of the centerline, each engine-powered propulsion means has a propeller or a water jet.

Furthermore, the survival craft may comprise a fourth pair of engine-powered propulsion means arranged between the first pair and second pair on opposite sides of the centerline, each engine-powered propulsion means has a propeller or a water jet.

In addition, each engine-powered propulsion means is operatively connected with a control unit. Furthermore, each engine-powered propulsion means is independently controlled.

Figure 4:
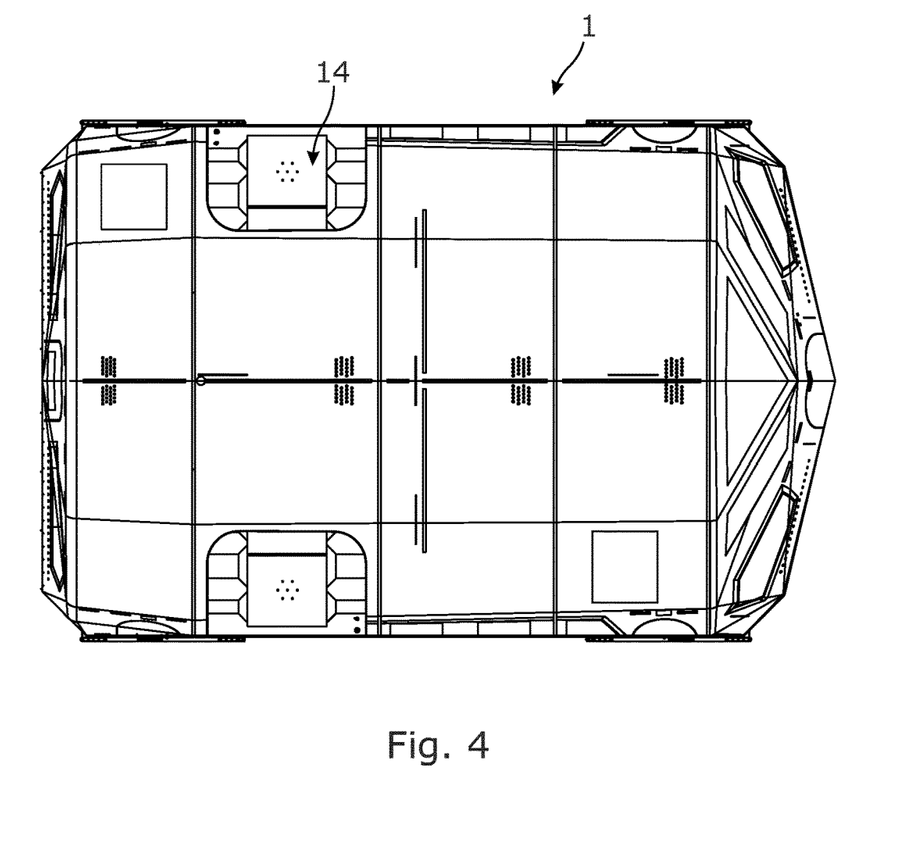
FIGS. 4-6 show the survival craft of FIG. 1 in a top view, a side view and a stern view, respectively.

FIGS. 4 to 7 show the survival craft 1 from different views. In FIG. 4, the survival craft is shown from a top view in which the survival craft is substantially square-formed. Especially when the survival craft 1 has a square-form, it has a quite large wetted surface area. This, in combination with the survival craft having a capacity of more than 150 persons, preferably more than 200 persons, provide difficulties in maneuvering the survival craft. The disclosed survival craft solves these challenges.

Furthermore, the survival craft may have an aspect ratio between a length and width above 3:2. In other designs of the survival craft it may have an aspect ratio of above 7:4, or for instance above 2:1.

Also, the survival craft may have a dimension above 10 meters in length and 6 meters in width, more preferably above 12 meters in length and 7 meters in width, and even more preferably around 12.5 meters in length and 8 meters in width.

In addition, the survival craft 1 has entry openings 14 in the canopy, enabling the passengers and crew members to enter the evacuation area.

In the shown embodiment, each corner of the survival craft 1 has an engine powered propulsion means which again facilitates maneuvering of the survival craft 1. Each engine-powered propulsion means is arranged in connection with a shell being connected with the non-rigid inflatable tubes.

Figure 5:
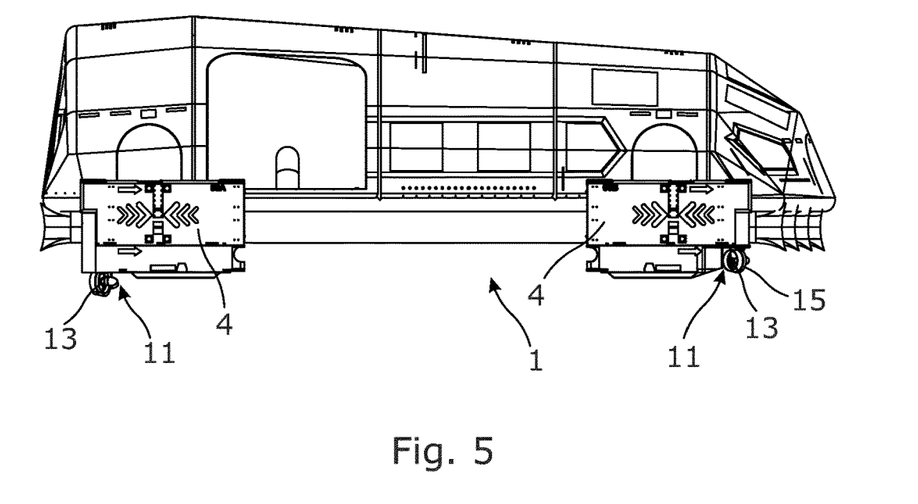

In FIG. 5, the survival craft 1 is shown in a side view, being the starboard side of the survival craft 1. At each corner of the survival craft 1, the shell 4 is arranged. The shells 4 comprises the engine-powered propulsion means 11, which in the present embodiment is equipped with propellers 13. Each propeller 13 is horizontally angled in relation to the centerline of the survival craft 1. The propellers 13 may advantageously be covered by an appropriate grate member 15, as shown in FIG. 5. Since passengers/crew members may be in the water during a rescue operation, a freely rotating propeller may cause potential danger to passengers in the water, and the propellers 13 may therefore be shielded by a grating member.

As shown in FIG. 5, the propellers 13 of the first pair of engine-powered propulsion means may be arranged at a lower depth than the propellers 13 of the second pair of engine-powered propulsion means. This also enhances the maneuverability of the survival craft 1.

Figure 6:
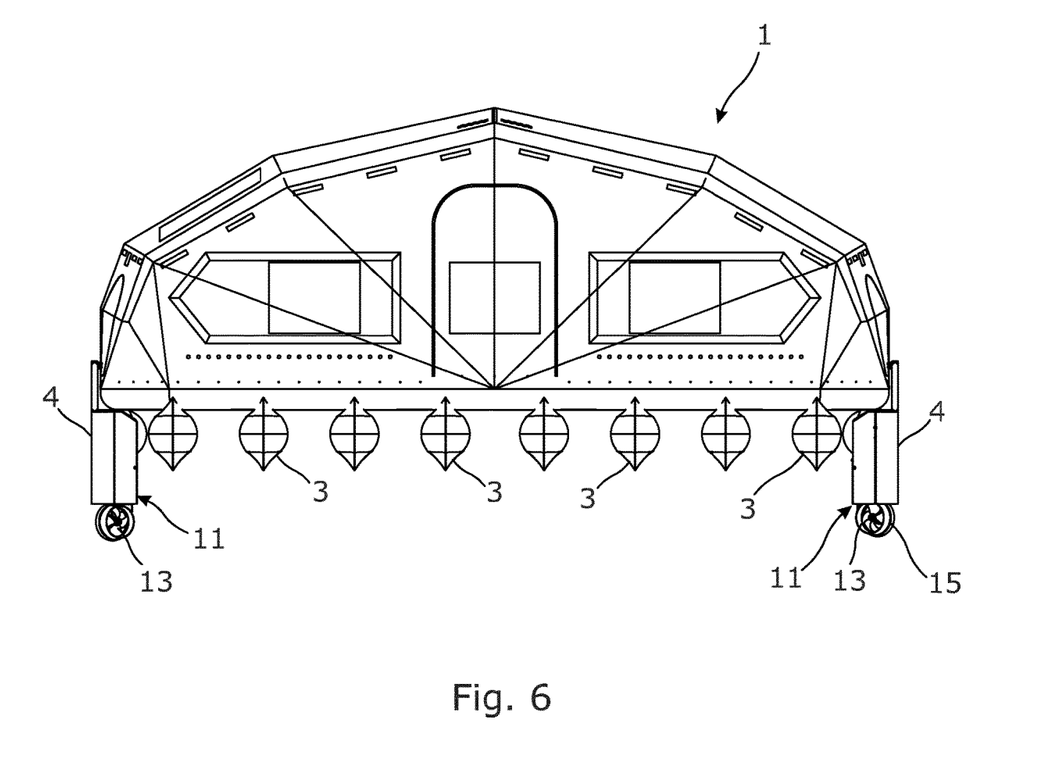

In FIG. 6, the survival craft 1 is shown from the stern side. The inflatable tubes 3 are arranged with a mutual distance between them for enhancing the flow between them, and thereby reducing the drag resistance of the survival craft 1 without jeopardizing the displacement of the survival craft 1. In addition, the shown shells 4 comprises the engine-powered propulsion means 11 being equipped with the propellers 13. As mentioned above, the propellers 13 are shielded by a grating member 15. According to the inventive idea, the propellers 13 have a horizontal angle in relation to the centerline.

Figure 7:
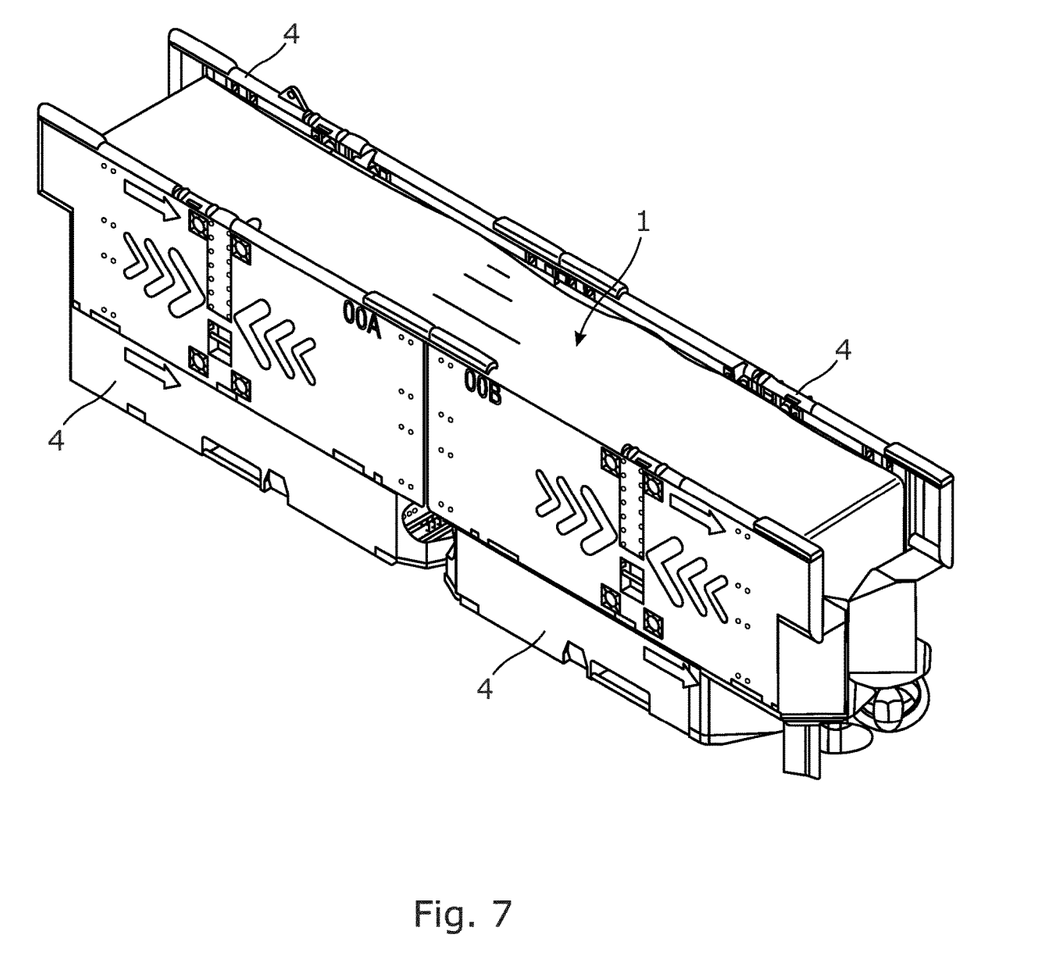
FIG. 7 shows the survival craft in a deflated state.

In FIG. 7, the survival craft 1 is shown in a deflated state. In the deflated, state the shells 4 are used to protect and house the deflated structure of the survival craft 1. In addition, the shells accommodate the engine-powered propulsion means in the storage situation.

Advantageously, each engine powered propulsion means is powered by electricity. To this effect, one or more power supply(ies) is/are arranged in the survival craft, preferably in the shells 4. The power supply is a battery pack.

Though, in another embodiment, the engine-powered propulsion means may be a combustion engine in which circumstance the power supply may be a fuel. However, presently electricity as power supply is preferred.

By placing several engine-powered propulsion means 11 in different positions of the survival craft 1, the propulsion force may be exerted from all these positions. However, when using inflatable structures for survival craft sailing through water, the lack of rigidity becomes a concern. Therefore, in order to avoid too much deformation of the survival craft 1, the engine-powered propulsion means 11 may advantageously be divided into smaller engine-powered propulsion means 11. Furthermore, this division helps the redundancy of the system, since the survival craft 1 may still be propelled through the water in case of some of the engine-powered propulsion means malfunctioning or is having a lack of power supply.

The propeller 13 is preferably lowered away from the bottom of the survival craft 1 in order to propel through water substantially not affected by the turbulence of the water created near the bottom of the survival craft. The propeller is preferably not lowered too deep due to moment arm considerations. The propeller is preferably lowered to a point of approximately 40 centimeters below the bottom.

Although the claimed invention has been described in the above in connection with preferred embodiments of the survival craft, it will be evident for a person skilled in the art that several modifications are conceivable without departing from the survival craft as defined by the following claims.

The invention claimed is:

1. A survival craft for maritime evacuation of passengers and crew members from a vessel or an offshore facility,
the survival craft having a hull, predominantly made of non-rigid inflatable tubes and one or more shells,
the hull having a length, a width and a centerline, a bow and a stern,
the survival craft further comprises:
a first pair of engine-powered propulsion means arranged at the stern on opposite sides of the centerline, and
a second pair of engine-powered propulsion means arranged at the bow on opposite sides of the centerline,
each engine-powered propulsion means has a propeller or a water jet, wherein a horizontal angle of each propeller or water jet of each engine-powered propulsion means can be independently set in relation to the centerline, the horizontal angle can be adjusted or set at a predetermined horizontal angle, the centerline is set to zero degrees, and each horizontal angle of each propeller or water jet is different from zero degrees.

2. The survival craft according to claim 1, wherein the horizontal angle is adjusted during movement of the survival craft.

3. The survival craft according to claim 1, wherein the horizontal angle is maintained during movement of the survival craft.

4. The survival craft according to claim 1, wherein each propeller or water jet of each engine-powered propulsion means of the first pair is arranged with a horizontal angle between 15 to 45 degrees in relation to the centerline.

5. The survival craft according to claim 4, wherein each propeller or water jet of each engine-powered propulsion means of the first pair is angled towards the centerline.

6. The survival craft according to claim 1, wherein each propeller or water jet of each engine-powered propulsion means of the second pair is arranged with a horizontal angle between 25 to 55 degrees in relation to the centerline.

7. The survival craft according to claim 6, wherein each propeller or water jet of each engine-powered propulsion means of the second pair is angled away from the centerline.

8. The survival craft according to claim 1, wherein each engine-powered propulsion means is operatively connected with a control unit.

9. The survival craft according to claim 1, wherein each engine-powered propulsion means is independently controlled.

10. The survival craft according to claim 1, wherein each engine-powered propulsion means is arranged in connection with a shell being connected with the non-rigid inflatable tubes.

11. The survival craft according to claim 1, wherein each engine-powered propulsion means is powered by electricity.

12. The survival craft according to claim 1, wherein the survival craft has a dimension above 10 meters in length and 6 meters in width.

13. The survival craft according to claim 4, wherein each propeller or water jet of each engine-powered propulsion means of the first pair is arranged with a horizontal angle between 30 to 40 degrees in relation to the centerline.

14. The survival craft according to claim 6, wherein each propeller or water jet of each engine-powered propulsion means of the second pair is arranged with a horizontal angle between 40 to 50 degrees in relation to the centerline.

15. The survival craft according to claim 12, wherein the survival craft has a dimension above 12 meters in length and 7 meters in width.

16. The survival craft according to claim 15, wherein the survival craft has a dimension above 12.5 meters in length and 8 meters in width.

* * * * *